(12) United States Patent
Yoshinaga et al.

(10) Patent No.: US 10,731,681 B2
(45) Date of Patent: Aug. 4, 2020

(54) BOOT BAND

(71) Applicant: NTN CORPORATION, Osaka (JP)

(72) Inventors: Shingo Yoshinaga, Shizuoka (JP);
Minoru Ishijima, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/752,026

(22) PCT Filed: Aug. 30, 2016

(86) PCT No.: PCT/JP2016/075363
§ 371 (c)(1),
(2) Date: Feb. 12, 2018

(87) PCT Pub. No.: WO2017/047377
PCT Pub. Date: Mar. 23, 2017

(65) Prior Publication Data
US 2018/0231035 A1 Aug. 16, 2018

(30) Foreign Application Priority Data

Sep. 18, 2015 (JP) ................................. 2015-185036
Dec. 24, 2015 (JP) ................................. 2015-251981

(51) Int. Cl.
*F16B 2/08* (2006.01)
*F16D 3/84* (2006.01)
(Continued)

(52) U.S. Cl.
CPC ................. *F16B 2/08* (2013.01); *F16B 2/18* (2013.01); *F16D 3/845* (2013.01); *F16D 3/2237* (2013.01); *F16D 2003/22316* (2013.01)

(58) Field of Classification Search
CPC ..... F16B 2/08; F16B 2/18; F16D 3/84; Y10T 24/1418; Y10T 24/1424
See application file for complete search history.

(56) References Cited

U.S. PATENT DOCUMENTS 2,005,341 A * 6/1935 Jesser .................. B65D 45/345
24/270
2,449,798 A * 9/1948 Weber ..................... F16L 33/12
24/270
(Continued)

FOREIGN PATENT DOCUMENTS

| JP | 10-26108 | 1/1998 |
| JP | 2013-160339 | 8/2013 |
| JP | 2016-31116 | 3/2016 |

OTHER PUBLICATIONS

International Preliminary Report on Patentability and Written Opinion of the International Searching Authority dated Mar. 20, 2018 in International (PCT) Application No. PCT/JP2016/075363.
(Continued)

*Primary Examiner* — Victor D Batson
*Assistant Examiner* — Matthew J Sullivan
(74) *Attorney, Agent, or Firm* — Wenderoth, Lind & Ponack, L.L.P.

(57) ABSTRACT

A boot band includes a band body, which is obtained by forming a band-plate-like member into a ring shape, and a lever, which is obtained by forming a strip-like member into an arc shape, and is provided on a joined portion of the band body. The boot band fastens a boot for a constant velocity universal joint, which is arranged on an inner side of the band body, by reducing the band body in diameter such that the lever is turned over using an end portion of the lever as a fulcrum and then superposed on the band body, thereby reducing the band body in diameter. The lever includes two chamfered portions formed in a fulcrum-side region of the end portion of the lever along a thickness direction of the lever.

5 Claims, 5 Drawing Sheets

(51) Int. Cl.
*F16B 2/18* (2006.01)
*F16D 3/223* (2011.01)
*F16D 3/2237* (2011.01)

(56) References Cited

U.S. PATENT DOCUMENTS

| | | | | |
|---|---|---|---|---|
| 2,504,881 A * | 4/1950 | Russell | ............... | F16L 55/1715 138/99 |
| 2,768,418 A * | 10/1956 | Hoy | ............... | F16L 33/12 24/20 CW |
| 3,021,584 A * | 2/1962 | Polanski | ............... | F16L 23/06 24/270 |
| 3,097,410 A * | 7/1963 | Lincoln | ............... | B01D 46/0076 24/270 |
| 3,141,642 A * | 7/1964 | Martin | ............... | F16L 37/20 24/270 |
| 3,183,569 A * | 5/1965 | Webb | ............... | F16L 3/1008 24/270 |
| 3,204,312 A * | 9/1965 | Derrickson | ............... | B65B 13/025 24/134 R |
| 3,237,267 A * | 3/1966 | Angus | ............... | F16B 2/18 24/270 |
| 3,276,089 A * | 10/1966 | Cheever | ............... | F16L 33/12 24/270 |
| 3,797,077 A * | 3/1974 | Omori | ............... | F16L 33/021 24/273 |
| 3,874,712 A * | 4/1975 | Watson | ............... | F16L 33/12 24/270 |
| 4,008,937 A * | 2/1977 | Filippi | ............... | F16L 23/06 174/78 |
| 4,034,826 A * | 7/1977 | Andrews | ............... | F01N 1/24 138/149 |
| 4,511,164 A * | 4/1985 | Orchard | ............... | F16L 33/12 24/270 |
| 4,701,982 A * | 10/1987 | Matsuno | ............... | F16B 2/08 24/19 |
| 4,965,914 A * | 10/1990 | Confer | ............... | E05C 19/14 24/270 |
| 5,044,814 A * | 9/1991 | Hama | ............... | F16L 33/12 24/20 R |
| 5,157,815 A * | 10/1992 | Dyer | ............... | F16L 33/035 24/20 R |
| 5,437,343 A * | 8/1995 | Cooley | ............... | E21B 10/5673 175/431 |
| 6,244,967 B1 | 6/2001 | Takabe et al. | | |
| 6,511,253 B1 * | 1/2003 | Grimes | ............... | F16B 2/08 285/321 |
| 6,645,360 B1 * | 11/2003 | Eisele | ............... | G01N 27/4077 204/408 |
| 7,222,397 B2 * | 5/2007 | Ito | ............... | F16L 33/035 24/20 R |
| 10,113,569 B2 * | 10/2018 | Oozeki | ............... | F16B 2/08 |
| 2018/0179780 A1 * | 6/2018 | Dershem | ............... | E04H 15/644 |

OTHER PUBLICATIONS

International Search Report (ISR) dated Oct. 4, 2016 in International (PCT) Application No. PCT/JP2016/075363.
Extended European Search Report dated May 10, 2019 in corresponding European Patent Application No. 16846248.9.

* cited by examiner

BOOT BAND

TECHNICAL FIELD

The present invention relates to a boot band configured to fasten a boot, which is mounted on a fixed type constant velocity universal joint and a plunging type constant velocity universal joint to be incorporated into an automobile or various types of industrial machinery and is configured to prevent entry of foreign matters from an outside of the joint and leakage of a lubricant from an inside of the joint.

BACKGROUND ART

For example, there are given two types of a constant velocity universal joint, specifically, a fixed type constant velocity universal joint and a plunging type constant velocity universal joint to be used as means for transmitting rotational torque from an engine of an automobile to a wheel at a constant velocity. Both of the constant velocity universal joints have a structure in which two shafts, specifically, a shaft on a driving side and a shaft on a driven side are coupled to each other to allow rotational torque to be transmitted at a constant velocity even when the two shafts form an operating angle.

It is required that a drive shaft configured to transmit power from an engine of an automobile to a driving wheel support angular displacement and axial displacement caused by a change in relative positional relationship between the engine and the wheel. Therefore, in general, the drive shaft has the following structure. That is, the plunging type constant velocity universal joint is mounted on an engine side (inboard side), and the fixed type constant velocity universal joint is mounted on a driving wheel side (outboard side). Both of the constant velocity universal joints are coupled to each other through intermediation of a shaft.

In the plunging type constant velocity universal joint or the fixed type constant velocity universal joint, in order to prevent leakage of a lubricant sealed in the joint and entry of foreign matters from an outside of the joint, a boot is mounted between an outer joint member of the constant velocity universal joint and the shaft. This type of boot is fastened with a metallic boot band (see, for example, Patent Literature 1) to be fixed to the outer joint member and the shaft, thereby ensuring a sealing performance.

The boot band disclosed in Patent Literature 1 is of a type called a one-touch operation type. The boot band includes a band body and a lever. The band body is formed into a ring shape by joining both end portions of a band-plate-like member together. The lever is obtained by forming a strip-like member into an arc shape and is provided on a joined portion of the band body.

The boot band is assembled in the following manner. First, prior to assembly of the boot band, an end portion of the boot is mounted to the outer joint member of the constant velocity universal jointer the shaft. At this time, the boot band is arranged on an outer side of the end portion of the boot.

Under this state, in the boot band, the lever is turned over using a proximal end portion of the lever as a fulcrum, and then the lever is superposed on the band body. In this manner, the band body is reduced in diameter. With the boot band in which the band body is reduced in diameter, the end portion of the boot is fastened and fixed to the outer joint member of the constant velocity universal joint or the shaft.

CITATION LIST

Patent Literature 1: JP 10-26108 A

SUMMARY OF INVENTION

Technical Problem

Incidentally, in general, in the boot band of the one-touch operation type, when the lever is turned over using the proximal end portion of the lever as the fulcrum, a portion of the band body to be brought into contact with the lever is bent along the proximal end portion of the lever. At this time, when an edge is formed in a fulcrum-side region of the proximal end portion of the lever, the contact portion of the band body to be brought into contact with the edge has a small curvature radius. As a result, stress is locally concentrated on the contact portion of the band body.

In a case in which the lever is turned over repeatedly when the boot band is reused in evaluation tests for the constant velocity universal joint, there is a fear in that occurrence of such local stress concentration may cause breakage of the band body due to metal fatigue at a vicinity of the fulcrum-side region of the proximal end portion of the lever.

In order to alleviate the above-mentioned local stress concentration and to prevent breakage of the band body resulting from repeated turning over of the lever, in the boot band disclosed in Patent Literature 1, the edge is eliminated from the fulcrum-side region of the proximal end portion of the lever, and the fulcrum-side region is formed into a curved surface.

However, in the boot band disclosed in Patent Literature 1, in order to eliminate the edge from the fulcrum-side region of the proximal end portion of the lever and to form the fulcrum-side region into the curved surface, it is necessary to perform edge eliminating processing such as barreling or shot blasting. As a result, cost of the boot band is increased.

Therefore, the present invention has been made in view of the above-mentioned problem, and has an object to provide a boot band, which is capable of preventing breakage of the band body by alleviating local stress concentration and reducing metal fatigue resulting from repeated turning over of the lever, and is capable of reducing cost by a simple and easy manner.

Solution to Problem

As technical means for achieving the above-mentioned object, according to the present invention, there is provided a boot band, comprising: a band body, which is obtained by forming a band-plate-like member into a ring shape by joining inner peripheral surfaces of both end portions of the band-plate-like member together so as to superpose the inner peripheral surfaces; and a lever, which is obtained by forming a strip-like member into an arc shape, and is provided on a joined portion of the band body, the boot band being configured to fasten a boot for a constant velocity universal joint, which is arranged on an inner side of the band body, by reducing the band body in diameter in such a manner that the lever is turned over using an end portion of the lever as a fulcrum and then superposed on the band body, the lever having a plurality of chamfered portions forced in a fulcrum-side region of the end portion of the lever along a thickness direction of the lever.

In the boot band according to the present invention, the lever has the plurality of chamfered portions formed in the fulcrum-side region of the end portion of the lever along the thickness direction of the lever. Thus, when the lever is turned over using the end portion of the lever as the fulcrum, the band body is bent along the plurality of chamfered portions formed at the end portion of the lever. A curvature radius at a portion of the band body to be brought into contact with the chamfered portions is increased, thereby being capable of alleviating local stress concentration on the contact portion of the band body.

As a result, even when the lever is turned over repeatedly, breaking strength of the band body can be ensured, thereby being capable of preventing breakage of the band body at the vicinity of the fulcrum-side region of the end portion of the lever. Further, the plurality of chamfered portions can be formed by a simple and easy manner. Thus, cost of the boot band can be reduced as compared to a case of employing barreling or the like.

In the present invention, it is desired that the plurality of chamfered portions comprise two chamfered portions, in which, as compared to an angle of a first chamfered portion that is the first of the two chamfered portions from the end portion of the lever, an angle of a second chamfered portion is larger with respect to a normal direction of the band body, or that the plurality of chamfered portions comprise three chamfered portions, in which, as compared to an angle of a first chamfered portion that is the first of the three chamfered portions from the end portion of the lever, an angle of a second chamfered portion is larger with respect to a normal direction of the band body, and an angle of a third chamfered portion is larger than the angle of the second chamfered portion with respect to the normal direction of the band body.

When such a configuration is adopted, local stress concentration on the contact portion of the band body can be reliably alleviated, and breaking strength of the band body can be ensured. As a result, breakage of the band body at the vicinity of the fulcrum-side region of the end portion of the lever can be reliably prevented. Further, the band body comprising the two or three chamfered portions can achieve simplification of processing, and thus can significantly reduce cost as compared to the case of employing barreling or the like.

In the present invention, it is desired that the two chamfered portions be formed so that the angle of the first chamfered portion is set to from 10° to 45° with respect to the normal direction of the band body, and the angle of the second chamfered portion is set to from 45° to 80° with respect to the normal direction of the band body. Further, it is desired that the three chamfered portions be formed so that the angle of the first chamfered portion is set to from 10° to 45° with respect to the normal direction of the band body, the angle of the second chamfered portion is set to from 30° to 60° with respect to the normal direction of the band body, and the angle of the third chamfered portion is set to from 50° to 80° with respect to the normal direction of the band body.

When such a configuration is adopted, the two or three chamfered portions can be set to optimum angles, and braking strength of the band body is easily ensured. As a result, even when the lever is turned over repeatedly, the band body can be further reliably prevented from breaking at the vicinity of the fulcrum-side region of the end portion of the lever.

Advantageous Effects of Invention

According to the present invention, it is possible to alleviate local stress concentration on the contact portion of the band body that occurs when the lever is turned over. Owing to alleviation of the local stress concentration, even when the lever is turned over repeatedly, breaking strength of the band body can be ensured, and breakage of the band body at the vicinity of the fulcrum-side region of the end portion of the lever can be prevented. Accordingly, the band can be reused in evaluation tests for the constant velocity universal joint. Further, the plurality of chamfered portions can be formed, by a simple and easy manner. Thus, cost of the boot band can foe reduced as compared to a case of employing barreling or the like. As a result, it is possible to provide an inexpensive boot band having high reliability and long lifetime.

DESCRIPTION OF EMBODIMENTS

A boot band according to an embodiment of the present invention is described below in detail with reference to the drawings.

As a constant velocity universal joint to which the boot band according to the embodiment described below is applied, there is exemplified an undercut-free constant velocity universal joint that is one type of a fixed constant velocity universal joint. The undercut-free constant velocity universal joint is incorporated into a drive shaft of an automobile, and has a structure in which two shafts, specifically, a shaft on a driving side and a shaft on a driven side are coupled to each other to allow rotational torque to be transmitted at a constant velocity even when the two shafts form an operating angle.

The present invention is applicable to other types of fixed type constant velocity universal joints such as a Rzeppa constant velocity universal joint. Further, the present invention is also applicable to plunging type constant velocity universal joints such as a double-offset constant velocity universal joint, a cross-groove constant velocity universal joint, and a tripod constant velocity universal joint.

Figure 7:
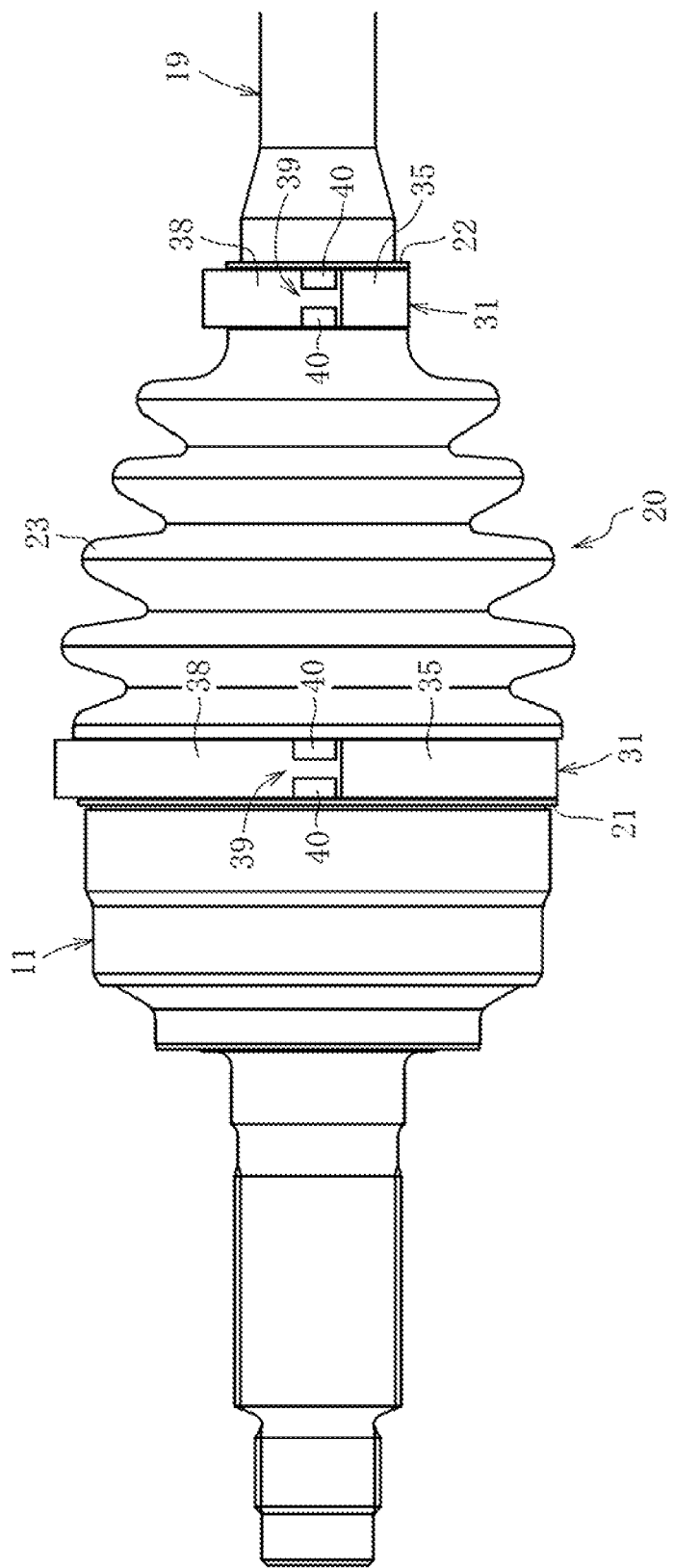
FIG. 7 is a front view for illustrating a stats in which end portions of the boot are fastened and fixed to the outer joint member of the constant velocity universal joint and the shaft by the boot bands.
Figure 8:
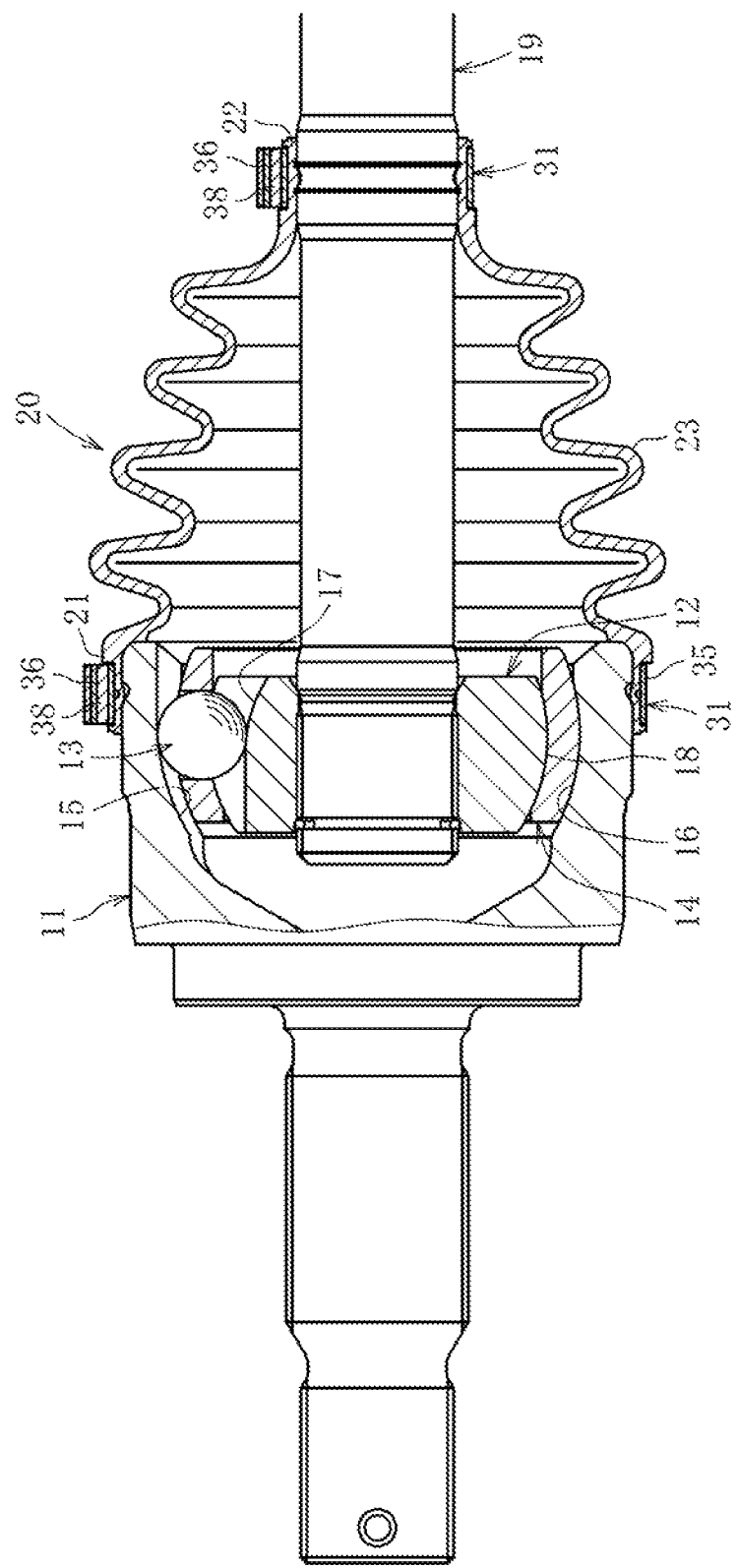
FIG. 8 is a sectional view of FIG. 7.

FIG. 7 is a view for illustrating an undercut-free constant velocity universal joint constructing a part of the drive shaft, a shaft, and a boot mounted between the constant velocity universal joint and the shaft. FIG. 8 is a sectional view of FIG. 7.

As illustrated in FIG. 7 and FIG. 8, the constant velocity universal joint comprises, as main components, an outer joint member 11, an inner joint member 12, balls 13, and a cage 14.

The outer joint member 11 has a spherical inner peripheral surface 16 in which a plurality of arc-shaped track grooves 15 are formed equiangularly along a circumferential direction so as to extend in an axial direction. The inner joint member 12 has a spherical outer peripheral surface 18 in which a plurality of arc-shaped track grooves 17 are formed equiangularly along a circumferential direction to be paired with the track grooves 15 of the outer joint member 11. The balls 13 are interposed between the track grooves 15 of the outer joint member 11 and the track grooves 17 of the inner joint member 12. The cage 14 is arranged between the spherical inner peripheral surface 16 of the outer joint member 11 and the spherical outer peripheral surface 18 of the inner joint member 12 to retain the balls 13.

An opening-side portion of each of the track grooves 15 of the outer joint member 11 and a far-side portion of each of the track grooves 17 of the inner joint member 12 are formed into straight shapes parallel to the axial direction of the joint. With this configuration, increase of the operating angle is achieved. One end of a shaft 19 is coupled to the inner joint member 12 by spline fitting. An inner joint member of a plunging type constant velocity universal joint (not shown) is coupled to another end of the shaft 19 by spline fitting.

In order to prevent leakage of a lubricant sealed in the joint and entry of foreign matters from an outside of the joint, the constant velocity universal joint has the structure in which a bellows-shaped boot 20 made of rubber or resin is mounted between the outer joint member 11 and the shaft 19. The lubricant is sealed in the outer joint member 11 and an internal space of the boot 20, thereby ensuring a lubricating performance when the shaft 19 is operated to rotate while forming the operating angle with respect to the outer joint member 11.

The boot 20 comprises a large-diameter end portion 21, a small-diameter end portion 22, and an elastic bellows portion 23. The large-diameter end portion 21 is fastened and fixed to an outer peripheral surface of the outer joint member 11 with a boot band 31. The small-diameter end portion 22 is fastened and fixed to the outer peripheral surface of the shaft 19 with the boot band 31. The elastic bellows portion 23 connects the large-diameter end portion 21 and the small-diameter end portion 22 to each other, and is reduced in diameter from the large-diameter end portion 21 toward the small-diameter end portion 22. The large-diameter end portion 21 and the small-diameter end portion 22 of the boot 20 are fastened and fixed with the boot bands 31, thereby ensuring a sealing performance.

The constant velocity universal joint has a function of rotating while forming the operating angle. Thus, as the boot 20, a boot which is made of rubber or resin and has a bellows shape enabling expansion and contraction is used in order to ensure flexibility which enables the boot 20 to follow the motion of the constant velocity universal joint. As a rubber material, there may be suitably employed a chloroprene rubber, a silicon rubber, or the like having a surface hardness Hs of from 45 to 75. Further, as a resin material, there may be suitably employed a thermoplastic polyester-based elastomer, a composite containing the thermoplastic polyester-based elastomer, or the like having surface hardness HD of from 38 to 55.

Figure 1:
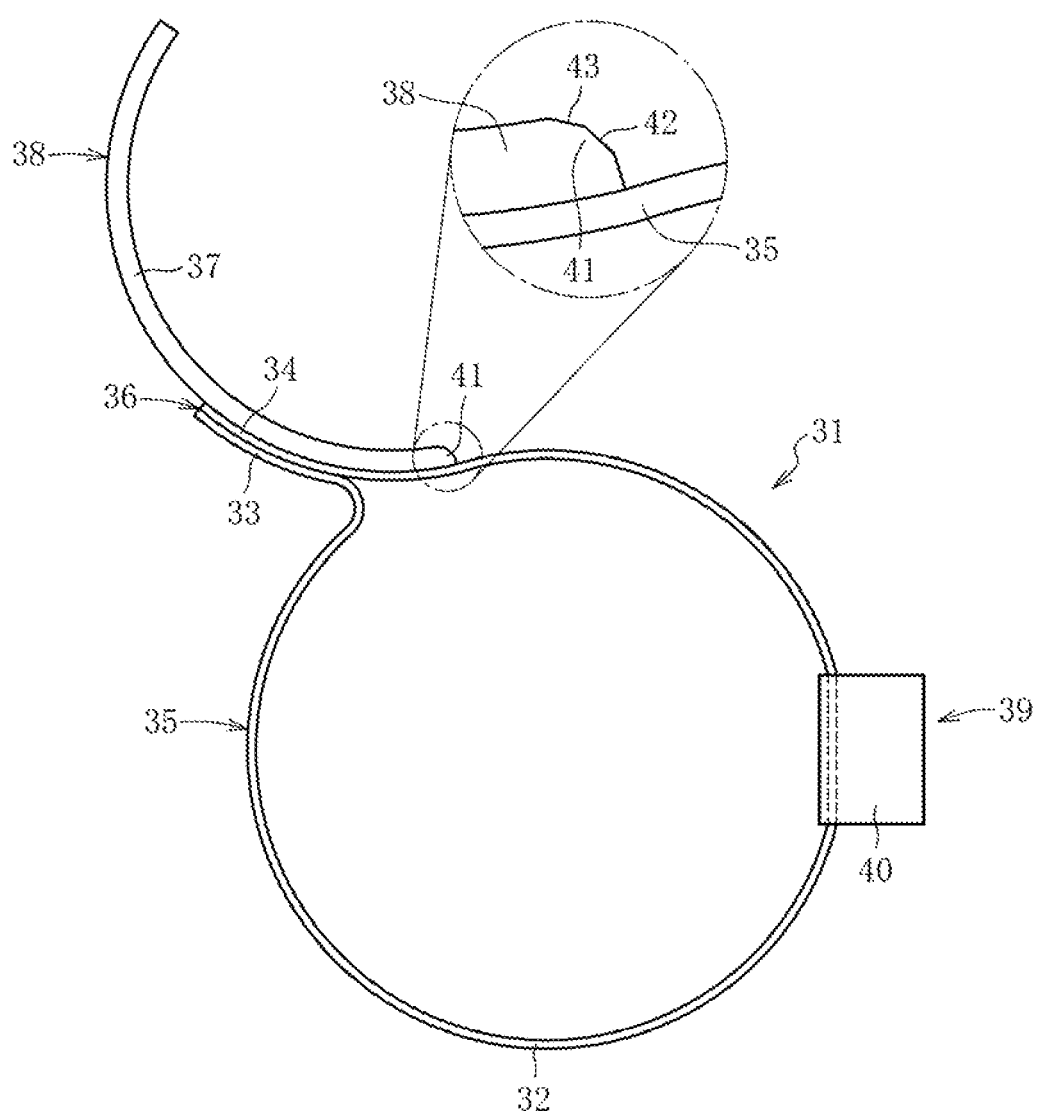
FIG. 1 is an illustration of a boot band according to an embodiment of the present invention, and is a front view for illustrating a state before a lever of the boot band is turned over.
Figure 2:
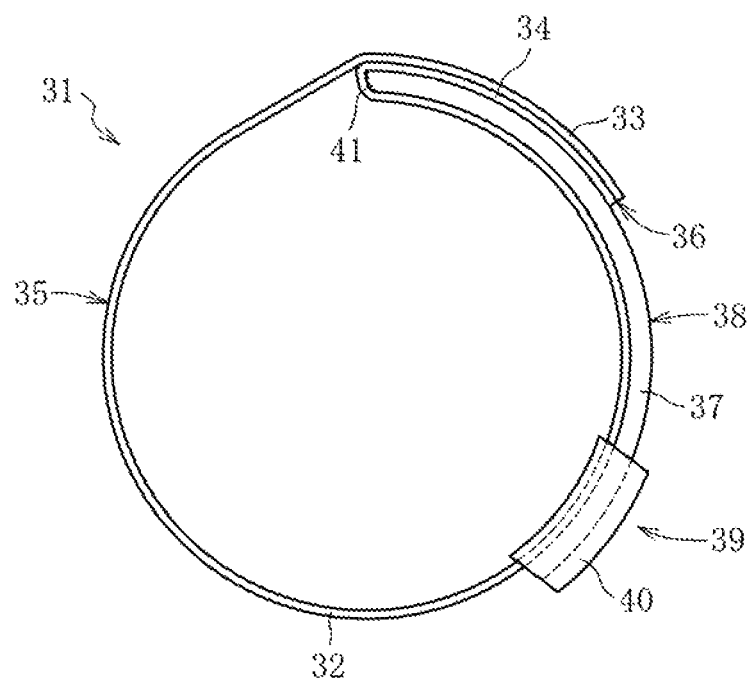
FIG. 2 is a front view for illustrating a state after the lever of the boot band is turned over.

The metallic boot bands 31 configured to fasten and fix the above-mentioned boot 20 to the outer joint member 11 and the shaft 19 have the following structure. FIG. 1 is an illustration of a state before the boot 20 (see FIG. 7) is fastened and fixed, and FIG. 2 is an illustration of a state after the boot 20 (see FIG. 7) is fastened and fixed.

The boot band 31 according to this embodiment is of a type called a one-touch operation type. As illustrated in FIG. 1, the boot band 31 comprises, as main components, a band body 35 and a lever 38. The band body 35 is formed into a ring shape by joining both end portions 33 and 34 of a metallic band-plate-like member 32 together. The lever 38 is obtained by forming a metallic strip-like member 37 into an arc shape, and is provided on a joined portion 36 of the band body 35. The band body 35 comprises a fixing portion 39 configured to fix the lever 38 having been turned over.

The band body 35 comprises the joined portion 36 formed by bringing an inner peripheral surface of one end portion 33 and an inner peripheral surface of another end portion 34 of the band-plate-like member 32 into abutment against each other and fixing the end portions 33 and 34 by soldering or the like. The lever 38 is mounted to the band body 35 by fixing a proximal end portion of the lever 38 to an outer peripheral surface of the joined portion 36 of the band body 35 by soldering or the like. The fixing portion 39 comprises a pair of tongue pieces 40 arranged on both sides of the band body 35 in a width direction so as to extend radially outward. The lever 38 is required to undergo a turning-over operation. Therefore, the lever 38 is thicker than the band body 35 in order to ensure strength of the lever 38.

The boot band 31 having the above-mentioned configuration is assembled in the following manner. Prior to assembly of the boot band 31, the large-diameter end portion 21 of the boot 20 is externally fitted to the outer peripheral surface of the outer joint member 11 of the constant velocity universal joint, and the small-diameter end portion 22 of the boot 20 is externally fitted to the outer peripheral surface of the shaft 19. At this time, the boot band 31 is arranged on an outer side of each of the large-diameter end portion 21 and the small-diameter end portion 22 of the boot 20.

Under this state, the lever 38 is turned over using the proximal end portion of the lever 38 of the boot band 31 as a fulcrum. Thus, a concave inner peripheral surface of the lever 38 is superposed on a convex outer peripheral surface of the band body 35. When the lever 38 is superposed on the band body 35, the band body 35 is reduced in diameter. With the boot band 31 in which the band body 35 is reduced in diameter, the boot 20 is fastened and fixed to the outer peripheral surface of the outer joint member 11 or the outer peripheral surface of the shaft 19.

The tongue pieces 40 of the fixing portion 39 of the band body 35 are caulked so as to be bent inwardly. In this manner, a distal end portion of the lever 38 is held down by the tongue pieces 40 and fixed to the band body 35.

Figure 3A:
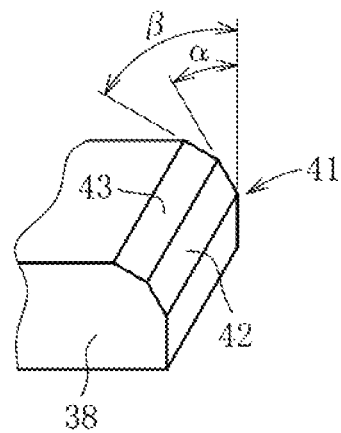
FIG. 3A is an illustration of a product 1 embodying the present invention, and is a perspective view for illustrating a fulcrum-side region of an end portion of a lever.

The boot band 31 according to the embodiment illustrated in FIG. 3A comprises a plurality of chamfered portions, for example two chamfered portions 42 and 43 formed in a fulcrum-side region 41 of the proximal end portion of the lever 38 along a thickness direction of the lever. In this embodiment, the two chamfered portions 42 and 43 are formed, but three or more chamfered portions may be formed. The boot band 31 according to the embodiment illustrated in FIG. 4A comprises three chamfered portions 44 to 46 formed in the fulcrum-side region 41 of the proximal end portion of the lever 38 along the thickness direction of the lever. Four or more chamfered portions may be formed, and the number of the chamfered portions may be freely selected.

Figure 3B:
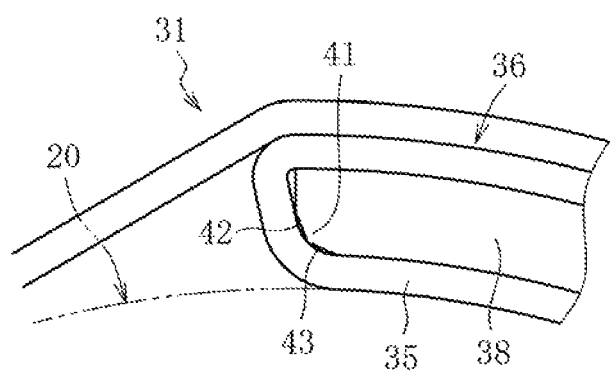
FIG. 3B is an illustration of the product 1 embodying the present invention, and is an enlarged sectional view of a main part for illustrating a state in which the lever of the boot band is turned over.

As described above, the two chamfered portions 42 and 43 or the three chamfered portions 44 to 46 are formed in the fulcrum-side region 41 of the proximal end portion of the lever 38. With this configuration, when the lever 38 is turned over using the proximal end portion of the lever 38 as the fulcrum, as illustrated in FIG. 3B or FIG. 4B, the band body 35 is bent along the two chamfered portions 42 and 43 or the three chamfered portions 44 to 45 formed on the proximal end portion of the lever 38.

A curvature radius at a portion of the band body 35 that is brought into contact with the chamfered portions 42 and 43 or the chamfered portions 44 and 46 is increased. Accordingly, the two chamfered portions 42 and 43 or the three chamfered portions 44 to 46 can alleviate local stress concentration on the contact portion of the band body 35.

As a result, in a case where the boot band 31 is reused in evaluation tests for the constant velocity universal joint, even when the lever 38 is turned over repeatedly, breaking strength of the band body 35 can be ensured. Further, breakage of the band body 35 at a vicinity of the fulcrum-side region 41 of the proximal end portion of the lever 38 is prevented. Further, the two chamfered portions 42 and 43 or the three chamfered portions 44 to 46 can be formed at low cost by a simple and easy manner such as cutting work or press working.

As illustrated in FIG. 3A, the two chamfered portions 42 and 43 are formed so that, as compared to an angle α of a first chamfered portion that is the first of the two chamfered portions 42 and 43 from the end portion of the lever 38, an angle β of a second chamfered portion is larger with respect to a normal direction of the band body 35. That is, the angle α of the first chamfered portion is set to from 10° to 45°, preferably from 20° to 40° with respect to the normal direction of the band body 35. The angle β of the second chamfered portion is set to from 45° to 80°, preferably from 50° to 70° with respect to the normal direction of the band body 35.

In this embodiment, the angle α of the first chamfered portion is set to 30° with respect to the normal direction of the band body 35, and the angle β of the second chamfered portion is set to 60° with respect to the normal direction of the band body 35.

Figure 4A:
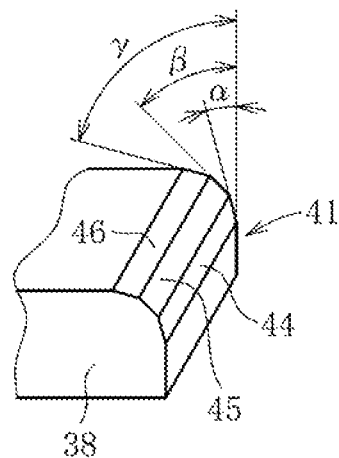
FIG. 4A is an illustration of a product 2 embodying the present invention, and is a perspective view for illustrating a fulcrum-side region of an end portion of a lever.
Figure 4B:
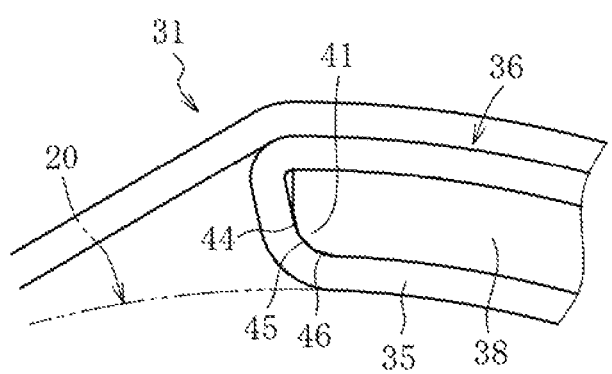
FIG. 4B is an illustration of the product 2 embodying the present invention, and is an enlarged sectional view of a main part for illustrating a state in which the lever of the boot band is turned over.

As illustrated in FIG. 4A, the three chamfered portions 44 to 46 are formed so that, as compared to an angle α of a first chamfered portion that is the first of the three chamfered portions 44 to 46 from the end portion of the lever 38, an angle β of a second chamfered portion is larger with respect to the normal direction of the band body 35, and that an angle γ of a third chamfered portion is larger than the angle β of the second chamfered portion with respect to the normal direction of the band body 35. That is, the angle α of the first chamfered portion is set to from 10° to 45°, preferably from 20° to 30° with respect to the normal direction of the band body 35. The angle β of the second chamfered portion is set to from 30° to 60°, preferably from 40° to 50° with respect to the normal direction of the band body 35. The angle γ of the third chamfered portion is set to from 50° to 80°, preferably from 65° to 75° with respect to the normal direction of the band body 35.

In this embodiment, the angle α of the first chamfered portion is set to 30° with respect to the normal direction of the band body 35. The angle β of the second chamfered portion is set to 50° with respect to the normal direction of the band body 35. The angle γ of the third chamfered portion is set to 70° with respect to the normal direction of the band body 35.

The angles α and β of the two chamfered portions, or the angles α, β, and γ of the three chamfered portions are set within the above-mentioned ranges. Thus, the two chamfered portions 42 and 43 or the three chamfered portions 44 to 46 can be set to optimum angles, and breaking strength of the band body 35 can be easily ensured. As a result, breakage of the band body 35 at the vicinity of the fulcrum-side region 41 of the proximal end portion of the lever 38 is prevented more reliably. Therefore, the band can be reused in evaluation tests for the constant velocity universal joint.

When the angles α and β of the two chamfered portions, or the angles α, β, and γ of the three chamfered portions deviate from the above-mentioned ranges, it is difficult to ensure breaking strength of the band body 35.

In a case of the two chamfered portions 42 and 43, when the angle α of the first chamfered portion is smaller than a lower limit value (10°), or the angle β of the second chamfered portion is larger than an upper limit value (80°), it is difficult to cause the chamfered portions to take effect, and difficult to form the chamfered portions. Further, when a boundary value between the upper limit value of the angle α of the first chamfered portion and the lower limit value of the angle β of the second chamfered portion is not 45°, it is difficult to obtain an equal dispersing effect from the two chamfered portions 42 and 43.

In a case of the three chamfered portions 44 to 46, when the angle α of the first chamfered portion is smaller than a lower limit value (10°), or the angle γ of the third chamfered portion is larger than an upper limit value (80°), it is difficult to cause the chamfered portions to take effect, and difficult to form the chamfered portions. Further, when a boundary value between the upper limit value of the angle α of the first chamfered portion and the lower limit value of the angle β of the second chamfered portion is not 45° or 30°, and a boundary value between the upper limit value of the angle of the second chamfered portion and the lower limit value of the angle γ of the third chamfered portion is not 60° or 50°, it is difficult to obtain an equal dispersing effect from the three chamfered portions 44 to 46.

EXAMPLE 1

Figure 5A:
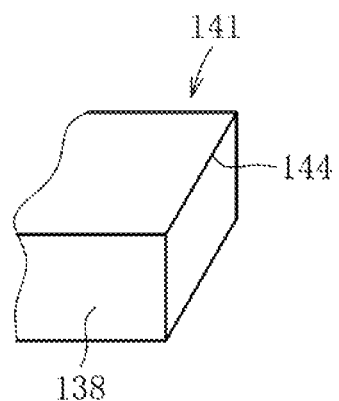
FIG. 5A is an illustration of a comparative product that is to be compared to the products embodying the present invention, and is a perspective view for illustrating a fulcrum-side region of an end portion of a lever.
Figure 5B:
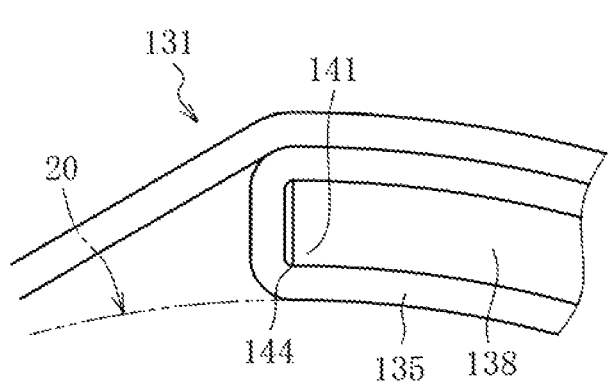
FIG. 5B is an illustration of the comparative product that is to be compared to the products embodying the present invention, and is an enlarged sectional view of a main part for illustrating a state in which the lever of the boot band is turned over.

The applicant of the present invention conducted tests to compare a boot band 31 (product 1 embodying the present invention) comprising the two chamfered portions 42 and 43 formed in the fulcrum-side region 41 of the proximal end portion of the lever 38 as illustrated in FIG. 3A and FIG. 3B, a boot band 31 (product 2 embodying the present invention) comprising the three chamfered portions 44 to 46 formed in the fulcrum-side region 41 of the proximal end portion of the lever 38 as illustrated in FIG. 4A and FIG. 4B, and a boot band 131 (comparative product) having no chamfered portion but comprising an edge portion 144 formed in a fulcrum-side region 141 of a proximal end portion of a lever 138 as illustrated in FIG. 5A and FIG. 5B.

In the tests, with regard to the products 1 and 2 embodying the present invention and the comparative product, the applicant verified the number of times the levers 38 and 138 were repeatedly turned over until the band bodies 35 and 135 broke at vicinities of the fulcrum-side regions 41 and 141 of the proximal end portions of the levers 38 and 138. The verification tests were conducted on four products 1 embodying the present invention, four products 2 embodying the present invention, and four comparative products.

Figure 6:
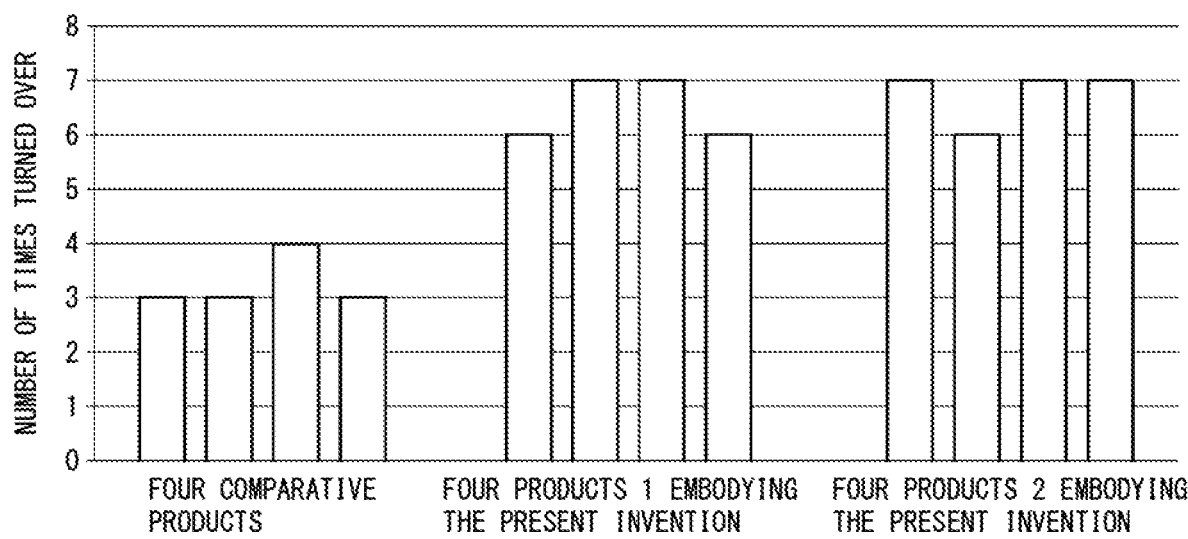
FIG. 6 is a graph for showing the number of times the lever was turned over until breakage of the band body in the products 1 and 2 embodying the present invention, and in the comparative product.

As a result, as shown in FIG. 6, in the four comparative products, the number of times of repetition until breakage of the band body 135 was from three to four. In contrast, in the four products 1 and the four products 2 embodying the present invention, the number of times of repetition until breakage of the band body 35 was from six to seven.

In the product 1 or the product 2 embodying the present invention (see FIG. 3B or FIG. 4B), when the lever 38 is turned over using the proximal end portion of the lever 38 as the fulcrum, a contact portion of the band body 35 to be brought into contact with the two chamfered portions 42 and 43 or the three chamfered portions 44 to 46 has a larger curvature radius than a contact portion of the band body 135 to be brought into contact with the edge portion 144 in the comparative product (see FIG. 4B). With this configuration, in the products 1 and 2 embodying the present invention, local stress concentration on the contact portion of the band body 35 can be alleviated.

As described above, in the product 1 or the product 2 embodying the present invention capable of alleviating local stress concentration on the contact portion of the band body 35, the lever can be turned over about twice as many times than in the comparative product. Thus, it is apparent that, in the product 1 or the product 2 embodying the present invention, the band body 35 can be prevented from breaking at the vicinity of the fulcrum-side region 41 of the proximal end portion of the lever 38 when the lever 38 is turned over.

The present invention is not limited to the above-mentioned embodiments. As a matter of course, various modifications can be made thereto without departing from the gist of the present invention. The scope of the present invention is defined in claims, and encompasses equivalents described in claims and all changes within the scope of claims.

The invention claimed is:

1. A boot band comprising:
a band body including a band-plate-shaped member having a ring shape with inner peripheral surfaces of both end portions of the band-plate-shaped member joined together, the inner peripheral surfaces being superimposed; and
a lever including a strip-shaped member having an arc shape and a plurality of chamfered portions formed at a fulcrum-side region of a proximal end portion of a concave inner peripheral surface of the lever along a thickness direction of the lever, the lever being provided at a joined portion of the band body,
wherein the lever is configured to be turned over with the proximal end portion of the lever being a fulcrum, the band body being brought into contact with the plurality of chamfered portions and bent along the plurality of chamfered portions and the lever being superposed on the band body such that the boot band is reduced in diameter to fasten a boot, which is to be arranged on an inner side of the band body, for a constant velocity universal joint.

2. The boot band according to claim 1, wherein
the plurality of chamfered portions comprises two chamfered portions, and
as compared to an angle of a first chamfered portion that is a first of the two chamfered portions from the proximal end portion of the lever, an angle of a second chamfered portion is larger with respect to a normal direction of the band body.

3. The boot band according to claim 2, wherein the two chamfered portions are formed so that the angle of the first chamfered portion is set to from 10° to 45° with respect to the normal direction of the band body, and the angle of the second chamfered portion is set to from 45° to 80° with respect to the normal direction of the band body.

4. The boot band according to claim 1, wherein
the plurality of chamfered portions comprises three chamfered portions, and
as compared to an angle of a first chamfered portion that is a first of the three chamfered portions from the proximal end portion of the lever, an angle of a second chamfered portion is larger with respect to a normal direction of the band body, and an angle of a third chamfered portion is larger than the angle of the second chamfered portion with respect to the normal direction of the band body.

5. The boot band according to claim 4, wherein the three chamfered portions are formed so that the angle of the first chamfered portion is set to from 10° to 45° with respect to the normal direction of the band body, the angle of the second chamfered portion is set to from 30° to 60° with respect to the normal direction of the band body, and the angle of the third chamfered portion is set to from 50° to 80° with respect to the normal direction of the band body.

* * * * *